United States Patent [19]
Gan et al.

[11] Patent Number: 5,308,895
[45] Date of Patent: May 3, 1994

[54] CURE INHIBITED EPOXY RESIN COMPOSITIONS AND LAMINATES PREPARED FROM THE COMPOSITIONS

[75] Inventors: Joseph Gan, Strasbourg, France; James L. Bertram, Lake Jackson, Tex.

[73] Assignee: The Dow Chemical Company, Midland, Mich.

[21] Appl. No.: 848,499

[22] Filed: Mar. 6, 1992

Related U.S. Application Data

[62] Division of Ser. No. 526,487, May 21, 1990, abandoned.

[51] Int. Cl.$^5$ .................... C08K 3/38; C08L 63/00
[52] U.S. Cl. ..................... 523/445; 528/89; 528/91
[58] Field of Search .............. 528/89, 91; 523/445

[56] References Cited

U.S. PATENT DOCUMENTS

| | | |
|---|---|---|
| 3,048,552 | 8/1962 | Fang . |
| 3,136,736 | 6/1964 | Washburne . |
| 3,565,861 | 2/1971 | White et al. . |
| 3,738,862 | 6/1973 | Klarquist et al. . |
| 3,947,345 | 3/1976 | Ogota et al. . |
| 3,975,346 | 8/1976 | Bosso et al. . |
| 4,001,156 | 1/1977 | Bosso et al. . |
| 4,069,055 | 1/1978 | Civello . |
| 4,318,766 | 2/1982 | Smith . |
| 4,322,456 | 3/1982 | Martin . |
| 4,358,578 | 11/1982 | Brownscombe . |
| 4,360,649 | 11/1982 | Kamio et al. ............... 528/111 |
| 4,410,596 | 10/1983 | Whiteside, Jr. et al. . |
| 4,438,254 | 3/1984 | Doorakian . |
| 4,544,732 | 10/1985 | Corley . |
| 4,554,342 | 11/1985 | Corley . |
| 4,581,436 | 4/1986 | Corley . |
| 4,594,291 | 6/1986 | Bertram et al. . |
| 4,631,306 | 12/1986 | Markert . |
| 4,668,758 | 5/1987 | Corley . |
| 4,692,504 | 9/1987 | Frank . |
| 4,725,652 | 2/1988 | Bertram et al. . |
| 4,766,196 | 8/1988 | Goel et al. . |
| 4,775,734 | 10/1988 | Goel . |
| 4,946,817 | 8/1990 | Bertram et al. . |

FOREIGN PATENT DOCUMENTS

| | | |
|---|---|---|
| 236117 | 2/1960 | Australia . |
| 600187 | 2/1972 | Canada . |
| 893191 | 2/1972 | Canada . |
| 58-138729 | 8/1983 | Japan . |
| 963058 | 9/1960 | United Kingdom . |
| 915704 | 1/1963 | United Kingdom . |

OTHER PUBLICATIONS

Proposed Mechanism for the Curing of Epoxy Resins with Amine-Lewis Acid Complexes or Salts by James J. Harris and Samuel C. Temin, J. Ap. Pol. Sc., vol. 10, pp. 523-534 (1966).

On the thermal behaviour of some alkylammonium tetrafluoroborates by Zabinsa, Ferloni and Sanesi, Journ. Calorim., Anal. Therm. Thermodyn. Chim., v. 17, pp. 250-253 (1986).

*Primary Examiner*—Melvyn I. Marquis
*Assistant Examiner*—D. Aylward

[57] ABSTRACT

In summary, the invention is related to the discovery of a class of compounds which inhibits the reaction of a polyepoxide with a curing agent at low temperatures. More particularly the invention relates to an epoxy resin composition comprising
a) a polyepoxide; and
b) a cure inhibitor comprising boric acid or maleic acid.

In another embodiment, the invention comprises an epoxy resin composition comprising
a) a polyepoxide;
b) a cure inhibitor comprising boric acid or maleic acid,
c) a curing agent without phenolic hydroxyl moieties, and
d) optionally a catalyst for the reaction of the polyepoxide with the curing agent.

In still another embodiment the invention relates to a composition useful for curing a polyepoxide which comprises
a) a curing agent capable of reacting with a polyepoxide at elevated temperatures; and
b) an inhibiting amount of boric acid or maleic acid; and optionally
c) a catalytic amount of a catalyst useful for accelerating the reaction of a polyepoxide with the curing agent.

7 Claims, No Drawings

CURE INHIBITED EPOXY RESIN COMPOSITIONS AND LAMINATES PREPARED FROM THE COMPOSITIONS

CROSS REFERENCE TO RELATED APPLICATION

This is a division from copending application Ser. No. 07/526,487 filed May 21, 1990, abandoned.

BACKGROUND OF INVENTION

This invention relates to epoxy resin compositions containing compounds which inhibit the cure of the epoxy resins at lower temperatures. The invention further relates to compositions useful for curing epoxy resins which comprise curing agents for the epoxy resins and the inhibitor described above. The invention further relates to coatings prepared from such inhibited resin compositions, and to materials coated with or encapsulated in such inhibited resin compositions. The invention further relates to laminates, prepregs, encapsulated materials and composites prepared from such inhibited resin compositions.

Epoxy resins are used in a variety of applications, as powder coatings, as electrical encapsulates, in composites, in solution coatings, in prepregs and in laminates. In many of these uses, it is desirable to partially cure the epoxy resin in a controllable manner, such that at a later time, when desired, the epoxy resin can be fully cured. In many uses it is desirable to contact a curing agent for an epoxy resin with an epoxy resin in the presence of a catalyst for the reaction and have the composition remain stable, that is uncured for a period of time. At present it is quite difficult to control the curing of an epoxy resin and retain the stability of a composition comprising an epoxy resin, a curing agent and catalyst for the reaction of the epoxy resin with the curing agent.

In some uses the epoxy resin, curing agent, and catalyst are contacted in solution and then applied as a coating on a substrate. In such uses, in order to achieve optimal properties in the eventually cured epoxy resin, the solvent or solvents must be removed. Often it is desirable to remove these solvents before significant curing takes place, otherwise the solvent may be entrapped in the cured epoxy resin, thereby adversely affecting the final properties of the cured resin. Often, the solvent is removed by exposing the coated article to elevated temperatures. At such temperatures the epoxy resin may have a tendency to begin to cure and entrap the solvent, thereby adversely affecting the final properties.

Cured and partially cured epoxy resins are used in laminates. A common process used in preparing glass laminates involves passing a glass cloth to be coated with an epoxy resin composition through a bath containing the resin, a curing agent for the resin and a catalyst for the curing reaction. Generally the bath contains one or more organic solvents in which the various components are dissolved or dispersed, with a solids contents of between about 45 and about 90 percent. The glass is resident in the bath for time sufficient to coat it with a mixture of the resin, curing agent and catalyst for the curing reaction. Thereafter the coated glass is passed through a heated zone to remove remaining solvent by evaporation. Generally, this zone is at a temperature of between 120 and 200° C. The residence time in this zone is sufficient to allow the solvents to be completely volatilized away. Thereafter the glass cloth, coated with the resin, curing agent and catalyst from which the solvents have been removed, may be controllably partially cured by exposing it to temperatures at which curing occurs. Such a product is referred to as a prepreg. The prepregs may then be stacked or formed into a shape and exposed to conditions under which the curing agent and resin completes the cure. In general, this involves contacting the various components of a laminate at elevated temperatures under pressure, for a period of time sufficient for the epoxy resin to further cure. Usually the pressure is provided by some kind of a press. Once the laminate is removed from the press it may, optionally, be exposed to elevated temperature for a period of time to complete the curing reaction. In this curing process the resin coating on the glass cloth flows and mixes with the coating on adjacent glass clothes thereby resulting in a fusing of the glass layers together, via the cured epoxy resin.

High glass transition temperatures are desirable for many uses, therefore methods of increasing the glass transition temperatures are desired. It is further desired to significantly decrease the time necessary to achieve complete cure. Prepreg producers and laminators desire a composition which facilitates faster processing. This allows the more efficient utilization of processing equipment. In order to facilitate faster processing the coated substrates must be exposed to higher temperatures or the epoxy resin compositions must contain higher levels of catalysts. Unfortunately, both solutions result in less control over the curing reaction and solvent can be trapped in the final product thereby affecting the ultimate properties.

In one embodiment, a process referred to as continuous pressing technology is used. In this process the prepregs are contacted at much higher temperatures than in conventional laminate processing for shorter periods, e.g. at temperatures around 210° C. for 2 to 4 minutes. It is very difficult to achieve complete cure under such conditions. One potential solution to this is to add a larger amount of catalyst or accelerator to the epoxy resin. Unfortunately if additional catalyst is added in the coating bath, then the ability to remove the solvent without significant curing of the epoxy resin, or to controllably partially cure the epoxy resin, is significantly reduced.

What is needed is an epoxy resin composition that does not undergo significant cure at temperatures at which solvents may be removed. What is further needed is an epoxy resin that can be controllably B-staged or partially advanced. What is further needed is an epoxy resin composition which allows the use of higher concentrations of curing catalysts or accelerators, which are stable at temperatures at which solvent is removed, and which allow controllable B-staging or partial advancement. What is further needed is an epoxy resin composition which when coated on a substrate can be processed faster without hurting the ultimate properties.

Frequently, for many products prepared using epoxy resins and cured epoxy resins several different entities may perform different parts of the manufacturing process. For example, one entity may make the resin, a second entity may make the resin formulations used to impregnate the reinforcing material, and a third may make a prepreg, or other article to be used. While a forth would make the final product such as a laminate or printed circuit board. Frequently the entity producing the prepreg or laminate has no expertise or desire to make the formulation. Therefore, it is desirable that a formulator be able to make a composition useful in coating the materials to be laminated. The problem is that if the epoxy resin curing agent and catalyst are preformulated, the formulation may not have significant longterm storage stability. Under such circumstances the formulation may undergo curing and therefore not be useful to the prepreg or laminate manufacturer. What is further needed is an epoxy resin composition containing a curing agent and accelerator for the cure which has significant stability at ambient temperatures for several weeks.

SUMMARY OF INVENTION

In summary, the invention is related to the discovery of a class of compounds which inhibits the reaction of a polyepoxide with a curing agent in the presence of a catalyst for the curing reaction at low temperatures. More particularly, the invention relates to an epoxy resin composition comprising
a) a polyepoxide and
b) a cure inhibitor comprising boric acid or maleic acid.

In another embodiment, the epoxy resin composition further comprises an epoxy resin catalyst, said catalyst being capable of accelerating the cure of the polyepoxide with a curing agent. In still another embodiment, the invention comprises an epoxy resin composition comprising
a) a polyepoxide;
b) a cure inhibitor comprising boric acid or maleic acid;
c) a curing agent for the polyepoxide which does not contain phenolic hydroxyl moieties;
d) optionally, a catalyst for the reaction of the polyepoxide with the curing agent; and
e) optionally, where a) is a diepoxide, a dihydroxy hydrocarbon or halogenated dihydroxy hydrocarbon.

In still another embodiment the invention relates to a composition useful for curing a polyepoxide which comprises
a) a curing agent capable of reacting with a polyepoxide wherein the curing agent does not contain phenolic hydroxyl moieties at elevated temperatures; and
b) an inhibiting amount of boric acid or maleic acid; and optionally
c) a catalytic amount of a catalyst useful for accelerating the reaction of a polyepoxide with the curing agent.

In still another embodiment, the invention relates to a process for coating a reinforcing material with an epoxy resin composition comprising contacting a reinforcing material with an intimately mixed composition comprising:
a) a polyepoxide;
b) a curing agent for the polyepoxide, wherein the curing agent does not contain phenolic hydroxyl moieties;
c) a cure inhibitor comprising boric acid or maleic acid;
d) a compound which catalyzes the curing of the polyepoxide with the curing agent; and
e) optionally, where a) is a diepoxide, a dihydroxy hydrocarbon or halogenated dihydroxy hydrocarbon.

The invention has several advantages. A composition comprising a polyepoxide, a curing agent, a catalyst, and inhibitor can be exposed to temperatures at which any solvent present is removed by evaporation without significant curing of the epoxy resin. Furthermore in the presence of the inhibitor, the concentration of catalyst present may be significantly higher without resulting in cure of the epoxy resin composition during a solvent removal process. A higher crosslink density may be achieved by using a larger concentration of catalyst. The final products prepared from these epoxy resin compositions may therefore exhibit a higher glass transition temperature. Those resin compositions which contain a polyepoxide, curing agent, catalyst and inhibitor have a significantly longer shelf life at ambient temperatures. The compositions of this invention may be processed at faster speeds as a higher concentration of accelerator may be used in processing. The compositions may also be processed at high temperatures without adversely affecting the final product properties, for example in the continuous pressing process.

DETAILED DESCRIPTION OF INVENTION

This invention relates to novel resin compositions and articles containing such resin compositions or coated with such resin compositions. In one embodiment, the invention is a composition comprising a polyepoxide in the presence of a cure inhibitor comprising boric acid or maleic acid. Such a composition could at some later time be combined with curing agent which does not contain phenolic hydroxyl moieties and catalyst for the curing reaction and thereafter can be used in one of many uses for an epoxy resin. Preferably this composition is stable for more than two months, more preferably six months or more, at ambient temperatures.

The inhibitor and catalyst could be contacted with the polyepoxide separately, or optionally, the inhibitor and catalyst could be contacted prior to contacting with the polyepoxide so as to form a complex, and thereafter the complex could be contacted with the polyepoxide.

In still another embodiment, a polyepoxide, a curing agent for the polyepoxide, where the curing agent does not contain a phenolic hydroxyl moiety, and an inhibitor comprising boric acid or maleic acid could be contacted. The catalyst useful for reacting the polyepoxide with the curing agent could be added to the composition and thereafter the composition could be used in any use of polyepoxide, known to those skilled in the art.

In still another embodiment, a polyepoxide could be contacted with a curing agent, an inhibitor comprising boric acid or maleic acid, and a catalyst for the reaction of an epoxy resin with the curing agent. The catalyst and inhibitor may be added separately, or added in the form of a preformed complex. Preferably, such a composition is stable at ambient temperatures for two weeks. Such a composition exhibits no significant change in gel time at 150° C. and 170° C. over a period of 10 days, more prefably 20 days and most preferably 30 days. This composition could be used in any of the known uses for polyepoxides i.e. epoxy resin compositions.

In another embodiment, the invention comprises a partially cured reaction product of a polyepoxide, a curing agent, wherein such partial cure occurs in the presence of catalyst for the reaction of the curing agent with a polyepoxide, and a cure inhibitor comprising boric acid or maleic acid. Such partially cured product can thereafter be used in several applications, such as coatings, laminates, composites, encapsulants, by contacting with the appropriate substrate reinforcing material or the like, and fully curing the composition. The processes for obtaining such a partially cured product are well-known in the art. In particular, the components are contacted under condition such that the curing agent and polyepoxide undergo partial reaction. In some embodiments the reactive ingredients are partially cured on the surface of a substrate.

In another embodiment, the curing agent is contacted with a cure inhibitor comprising boric acid or maleic acid and, optionally, a catalyst for the cure of a polyepoxide by the curing agent. This composition is at some time thereafter contacted with polyepoxide and subjected to curing conditions.

The compositions described herein may be found in various forms. In particular the various compositions described may be found in powder form, or alternatively in solution or dispersion. In those embodiments where the various compositions are in solution or dispersion, the various components of the composition may be separately dissolved in a solvent suitable for that component, then the various solutions are combined and intimately mixed. Note the solvents for the various components are preferably chosen such that the solvents are miscible with one another. Intimately mixed as used herein refers to agitating a mixture of solutions which is a relatively homogeneous solution or dispersion. Alternatively, the components may be dissolved or dispersed in the same solvent or dispersant. In those embodiments wherein the compositions are partially cured or advanced, the compositions of this invention may be found in a powder form, solution form, or coated on a particular substrate.

Polyepoxide as used herein refers to a compound containing more than one epoxy moiety. In another embodiment it refers to a mixture of compounds which contains, on average, more than one epoxy moiety per molecule. Polyepoxide as used herein includes partially advanced epoxy resins i.e. the reaction of a polyepoxide and a curing agent, wherein the reaction product has an average at least one unreacted epoxide unit per molecule.

Polyepoxides (polyglycidyl ethers of a polyhydroxy hydrocarbon) are prepared by reacting an epihalohydrin with a polyhydroxy hydrocarbon or a halogenated polyhydroxy hydrocarbon. The preparation of such compounds is well known in the art. See Kirk-Othmer Encyclopedia of Chemical Technology 3rd Ed. Vol. 9 pp 267–289, incorporated herein by reference.

The epihalohydrins correspond to formula I

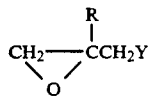

1 wherein Y is a halogen, preferably chloro or bromo, and most preferably chloro; and R is hydrogen or $C_{1-4}$ alkyl, and more preferably methyl.

Polyhydroxy hydrocarbon means herein a compound with a hydrocarbon backbone and more than one primary or secondary hydroxy moieties, preferably two or more. Halogenated polyhydroxy hydrocarbon means herein a compound with a hydrocarbon backbone which is substituted with one or more halogens and more than one, preferably two or more, primary or secondary hydroxy moieties. The hydroxyl moieties may be aromatic aliphatic or cycloaliphatic.

Among preferred classes of polyhydroxy hydrocarbons and halogenated polyhydroxy hydrocarbons are the bisphenols; halogenated bisphenols; hydrogenated bisphenols; novolac resins, i.e. the reaction product of phenols and simple aldehydes, preferably formaldehyde; and polyalkylene glycols.

Preferred polyhydroxy hydrocarbons, and halogenated polyhydroxy hydrocarbons include those corresponding to formulas 2 to 5:

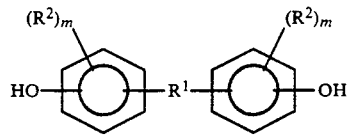

2

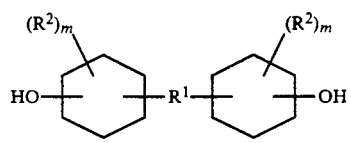

3

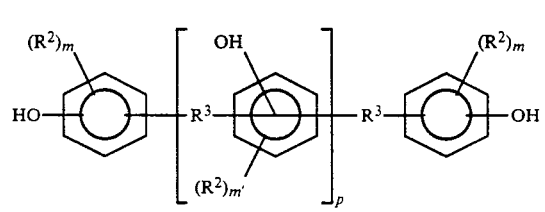

4

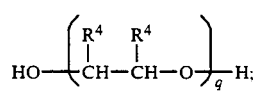

5 wherein:

$R^1$ is separately in each occurrence $C_{1-10}$ alkylene, $C_{1-10}$ haloalkylene, $C_{4-10}$ cycloalkylene, carbonyl, sulfonyl, sulfinyl, oxygen, sulfur, a direct bond or a moiety corresponding to the formula;

$R^2$ is separately in each occurrence $C_{1-3}$ alkyl or a halogen;

$R^3$ is separately in each occurrence $C_{1-10}$ alkylene or $C_{5-50}$ cycloalkylene;

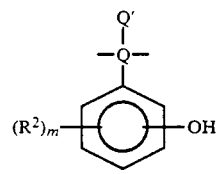

$R^4$ is separately in each occurrence hydrogen, methyl, halomethyl, or ethyl, with the proviso that only one $R^4$ on an ethylene unit can be methyl, halomethyl or ethyl;

Q is separately in each occurrence a $C_{1-10}$ hydrocarbyl moiety;

Q' is separately in each occurrence hydrogen, cyano, or a $C_{1-14}$ alkyl group;

m is independently in each occurrence an integer of 0 to 4;

m' is separately in each occurrence an integer of from 0 to 3;

p is a positive real number of 0 to 10;

q is a positive real number of 1 to 80.

$R^1$ is preferably $C_{1-3}$ alkylene, $C_{1-3}$ haloalkylene, carbonyl, sulfur, or a direct bond. $R^1$ is more preferably a direct bond, propylene, or fluorinated propylene ($=C(CF_3)_2-$). $R^1$ is most preferably propylene. $R^2$ is preferably methyl, bromo or chloro; and most preferably methyl or bromo. $R^3$ is preferably $C_{1-3}$ alkylene or polycyclic moiety corresponding to the formula pounds wherein all of the hydrogen atoms have been replaced by halogen atoms. Alkylene as used herein refers to a divalent alkyl moiety.

The polyepoxides preferably correspond to one of formulas 6 to 9.

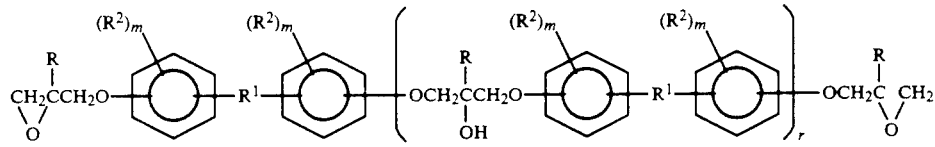   6

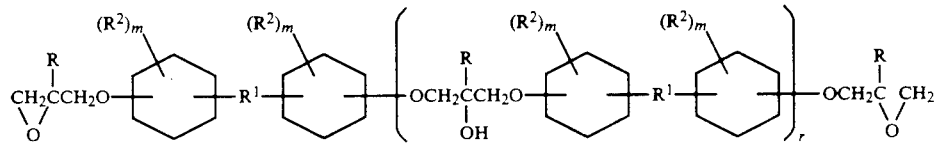   7

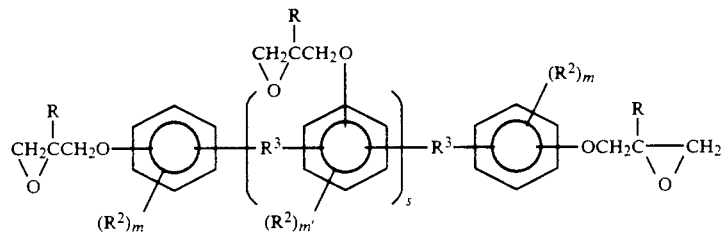   8

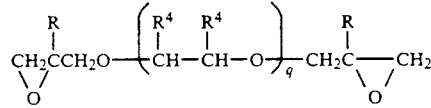   9

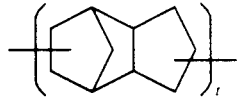

wherein t is an average number between 1 and 6 inclusive, preferably 1 and 3, most preferably 1. Preferably, m' is an integer of 0 to 2. Preferably, m is an integer of 0 to 2. Preferably, p is a positive real number of 0 to 8; and more preferably 0 to 4. Preferably, q is a positive real number between 2 and 40, and more preferably between 2 and 20 and most preferably 5 and 15. P and q represent an average number, as the compounds to which they refer are generally found as a mixture of compounds with a distribution of the units to which p and q refer. Cycloalkylene as used herein refers to mono cyclic and poly cyclic hydrocarbon moieties.

Among preferred polyhydroxy hydrocarbon are the dihydroxy phenols. Preferable dihydroxy phenols include those which contain substituents that are non-reactive with the phenolic groups. Illustrative of such phenols are 2,2-bis(3,5-dibromo-4-hydroxyphenyl) propane; 2,2-bis(4-hydroxyphenyl) propane; 2,2-bis(3,5-dichloro-4-hydroxyphenyl) propane; bis (4-hydroxyphenyl) methane; 1,1-bis(4-hydroxyphenyl)-1-phenyl ethane; 1,1'-bis(2,6-dibromo-3,5-dimethyl-4 hydroxy phenyl) propane; bis (4-hydroxyphenyl) sulfone; bis (4-hydroxyphenyl) sulfide; resorcinol; hydroquinone; and the like. The preferred dihydroxy phenolic compound is 2,2-bis(4-hydroxyphenyl) propane (bisphenol A) and 2,2-bis(4-hydroxy-3,5-dibromophenyl) propane.

As used herein haloalkyl refers to a compound with a carbon chain and one or more of the hydrogens replaced with a halogen. Haloalkyl also means comwherein $R^1$, $R^2$, $R^3$, $R^4$, m, m' and q are as defined previously; r is a positive real number of 0 to 40; and s is a positive real number of 0 to 10. Preferably, r is a positive real number of 0 to 10, and most preferably 1 to 5. Preferably, s is a positive real number of 0 to 8; and most preferably 1 to 4. All of the variables referred to herein as positive real numbers, i.e. r and s, are average numbers as the compounds referred to contain a distribution of units.

In one embodiment polyepoxides refers to an advanced epoxy resin which is the reaction product of one or more polyepoxides, as described previously, with one or more polyhydroxy hydrocarbons or a halogenated derivative thereof. Such polyhydroxy hydrocarbons have been described previously. Alternatively, a polyepoxide can be reacted with a carboxyl substituted hydrocarbon. A carboxyl substituted hydrocarbon is a compound with a hydrocarbon backbone and one or more carboxyl moieties, preferably more than one, and most preferably two. Preferably such compounds correspond to formula 10;

$$R^5(COOH)_u \qquad 10$$

wherein $R^5$ is $C_{1-40}$ hydrocarbyl moiety optionally containing oxygen along the backbone, and u is an integer of one or greater. $R^5$ is preferably a $C_{1-40}$ straight or branched chain alkane or alkene, optionally containing oxygen. Preferably u is 1 to 4, and most preferably 2. Fatty acids and fatty acid dimers are among the useful carboxylic acid substituted hydrocarbons. Included in the fatty acids are caproic acid, caprylic acid, capric acid, octanoic acid, versatic acid, decanoic acid, lauric acid, myristic acid, palmitic acid, stearic acid, palmitoleic acid, oleic acid, linoleic acid, linolenic acid, erucic acid, pentadecanoic acid, margaric acid, arachidic acid, and dimers thereof.

In one preferred embodiment a one or more polyhydroxy hydrocarbons or halogenated derivatives thereof and one or more carboxyl substituted hydrocarbons are reacted with the polyglycidyl ether of a polyhydroxy compound or halogenated derivative thereof. Procedures for performing such a reaction are well known in the art. See "The Handbook of Epoxy Resins" by H. Lee and K. Neville (1967) McGraw Hill, N.Y. and U.S. Pat. Nos. 2,633,458; 3,477,990; 3,821,243; 3,907,719, 3,975,397; and 4,071,477. Optionally, a small amount of a monohydroxy substituted hydrocarbon can be included in the reaction mixture.

In another embodiment, the polyepoxide is the reaction product of a polyepoxide and a compound containing more than one isocyanate moiety, a polyisocyanate. Preferably the polyepoxide is an epoxy-terminated polyoxazolidone having from 5 to 30, preferably 5 to 20, most preferably 10 to 20 weight percent isocyanate content and having from 50 to 100 percent of the original isocyanate groups converted to oxazolidone rings and from 0 to 50 percent of the original isocyanate groups converted to isocyanurate rings whenever prepared according to the process described herein.

Epoxy-terminated polyoxazolidone (isocyanate modified epoxy resin) are preferably prepared by the process which comprises reacting a polyepoxide compound with a polyisocyanate compound in the presence of a catalyst for the reaction of the epoxy and isocyanate groups at an elevated temperature. Preferably the process involves first adding (1) from 5 to 30, preferably 5 to 20, most preferably from 10 to 20, weight percent of the polyisocyanate compound within a period of time of from 3 to 90, preferably 15 to 60, most preferably 20 to 45, minutes to (2) a mixture comprising (a) from 70 to 95, preferably 80 to 95, most preferably 80 to 90, weight percent of the polyepoxide compound and (b) from 0.01 to 2, preferably 0.02 to 1, most preferably 0.02 to 0.1, weight percent of the catalyst, said weight percentages being based on the combined weight of the polyepoxide compound and polyisocyanate compound. The mixture is thereafter heated to a temperature of from 110° C. to 200° C., preferably 120° C. to 180° C., most preferably 140° C. to 160° C., for a period of time from 5 to 180, preferably 30 to 120, most preferably 60 to 90, minutes. The conversion of isocyanate groups to the oxazolidone and isocyanurate rings is controlled in any of the following manner:

(i) by increasing the reaction temperature at a given amount of the catalyst and a given amount of the polyisocyanate compound used when higher conversion to oxazolidone rings is desired; or (ii) by increasing the amount of the catalyst at a given reaction temperature and a given amount of the polyisocyanate compound used when higher conversion to oxazolidone rings is desired; or (iii) by increasing the amount of the polyisocyanate used at a given amount of the catalyst and a given reaction temperature when higher conversion to isocyanurate rings is desired; or (iv) by increasing the rate of addition of the polyisocyanate compound at a given reaction temperature, given amount of the catalyst and given amounts of the polyepoxide and polyisocyanate compounds when higher conversion to isocyanurate rings is desired.

The polyepoxides useful for this embodiment are described hereinbefore. The polyisocyanate compounds useful are represented by the following general formula:

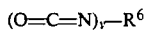

wherein $R^6$ is substituted or unsubstituted aliphatic, aromatic or heterocyclic polyvalent group and v has an average value of greater than 1 to less than 5, preferably from 1.5 to 4, most preferably from 2 to 3. Examples of suitable polyisocyanates include 4,4'-methylene bis(phenylisocyanate) (MDI) and isomers thereof, higher functional homologs of MDI (commonly designated as "polymeric MDI"), toluene diisocyanate (TDI) such as 2,4-toluene diisocyanate and 2,6-toluene diisocyanate, m-xylylene diisocyanate, hexamethylene diisocyanate (HMDI) and isophoronediisocyanate. Mixtures of any two or more polyisocyanates can also be used in the practice of the present invention. Other suitable polyisocyanate compounds are described in U.S. Pat. Nos. 3,313,747; 4,066,628 and 4,742,146.

Preferred polyisocyanate compounds are 4,4'-methylene bis(phenylisocyanate) (MDI) and isomers thereof, polymeric MDI and toluene diisocyanate (TDI). The most preferred polyisocyanate compounds are 4,4'-methylene bis(phenylisocyanate), isomers thereof and polymeric MDI.

A suitable catalyst is employed to facilitate reaction of the polyepoxide compound with the polyisocyanate compound. Examples of useful catalysts include zinc carboxylate, organozinc chelate compound, trialkyl aluminum, quaternary phosphonium and ammonium salts, tertiary amines and imidazole compounds. The preferred catalysts are imidazole compounds. Particularly, preferred catalysts are 2-phenyl imidazole 2-methyl imidazole, 1-methyl imidazole, 2-ethyl-4-methyl imidazole and 4,4'-methylene-bis(2-ethyl-4-methyl imidazole). The catalyst is generally employed in an amount of from 0.01 to 2; preferably 0.02 to 1, most preferably 0.02 to 0.1, weight percent based on the combined weight of the polyepoxide compound and polyisocyanate compound used. The polyisocyanate compound is employed in an amount of from 5 to 30, preferably 5 to 20, most preferably 10 to 20, weight percent, the weight percent being based on the combined weight of the polyepoxide and polyisocyanate reactants. The polyepoxide compound is employed in an amount of from 70 to 95, preferably 80 to 95, most preferably 80 to 90, weight percent, the weight percent being based on the combined weight of the polyepoxide and polyisocyanate reactants.

Preferably the catalyst is added to the reaction vessel containing the polyepoxide prior to the start of the addition of polyisocyanate compound. The catalyst can be dissolved in a suitable solvent prior to the addition to the polyepoxide to improve homogenization if desired. A temperature at which the catalyst is added is not critical. In general the catalyst is added at a temperature lower than the reaction temperature. The temperature is then raised and the reaction temperature maintained while the controlled addition of the polyisocyanate to the mixture of the catalyst and the polyepoxide is started. The polyisocyanate is added to the reaction vessel within a period of time of from 3 to 90, preferably 15 to 60, most preferably 20 to 45, minutes while maintaining the reaction temperature. The reaction temperature is maintained after the complete addition of the polyisocyanate for a period of time of from 5 to 180, preferably 15 to 120, most preferably 30 to 90 minutes. In general, the reaction of the polyepoxide compound and the polyisocyanate compound is conducted neat, i.e., in the absence of a solvent or other liquid reaction diluent.

Curing agents useful in this invention are those compounds known to the skilled artisan to react with polyepoxides or advanced epoxy resins to form hardened final products and which do not contain phenolic hydroxy moieties which function to cure the epoxy resin. Included among such useful curing agents are materials which are acidic or alkaline.

Examples of suitable curing agents include among others, the polybasic acids and their anhydrides, such as, for example, the di-, tri-, and higher carboxylic acids as oxalic acid, phthalic acid, terphtalic acid, succinic acid, alkyl and alkenyl-substituted succinic acids, tartaric acid, and particularly the polymerized unsaturated acids, such as for example those containing at least 10 carbon atoms, and preferably more than 14 carbon atoms, as for instance dodecenedioic acid, 10,12-eicosadienedioic acid, and anhydrides such as phthalic anhydride, succinic anhydride, maleic anhydride, nadic anhydride (endo-cis-bicyclo-(2,21)-5 heptane 2,3 dicarboxylic anhydride), nadic methyl anhydride (methyl bicyclo (2.21) heptene, 2,3 dicarboxylic anhydride isomers) ethylene diamine), pyromellitic anhydride, trimellitic anhydride and the like. Other types of acids that are useful are those containing sulfur, nitrogen, phosphorus or halogens; chloridic acid, benzene phosphonic, sulfonyl dipropionic acid bis(4-carboxyphenyl-)amide.

Other preferred curing agents include the amino-containing compounds, such as, for example, diethylene triamine, triethylene tetramine, dicyandiamide, benzoguanimine, melamine, pyridine, cyclohexylamine, benzyldimethylamine, benzylamine, diethylaniline, triethanolamine, piperidine, tetramethylpiperamine, N,N-dibutyl-1,3-propane diamine, N,N-diethyl-1,3-propane diamine, 1,2-diamino-2-methylpropane. 2,3-diamino-2-methylbutane, 2,3-diamino-2-methylpentane, 2,4-diamino-2,6-dimethyloctane, dibutylamine, dioctylamine, dinonylamine, distearylamide, diallylamine, dicyclohexylamine, methylethylamine, ethylcyclohexylamine, pyrrolidine, 2-methylpyrrolidine, tetrahydropyridine, 2-methylpiperidine, 2,6-dimethylpiperidine, diaminopyridine, meta-phenylene diamine and the like, and soluble adducts of amines and polyepoxides and their salts, such as described in U.S. Pat. Nos. 2,651,589 and 2,640,037. Still other examples include the acetone soluble reaction products of polyamines and monoepoxides, the acetone soluble reaction products of polyamines with unsaturated nitriles, such as acrylonitrile, imidazoline compounds as obtained by reacting monocarboyxlic acids with polyamines, sulfur and/or phosphorus-containing polyamines as obtained by reacting a mercaptan or phosphine containing active hydrogen with an epoxide halide to form a halohydrin, dehydrochlorinating and then reacting the resulting product with a polyamine, soluble reaction product of polyamines with acrylate, and many other types of reaction products of the amines.

Still other curing agents that may be used include boron trifluoride and complexes of boron trifluoride with amines, ethers, phenols and the like. Friedel-Crafts metals salts, such as aluminum chloride, zinc chloride, and other salts, such as zinc fluorborate, magnesium perchlorate and zinc fluosilicate: inorganic acids and partial esters as phosphoric acid and partial esters as phosphoric acid and partial esters thereof including n-butyl orthothiophosphate, diethyl orthophosphate and hexaethyltetraphosphate and the like.

Another type curing agent to be employed includes the polyamides containing active amino and/or carboxyl groups, and preferably those containing a plurality of amino hydrogen atoms. Examples of polybasic material used in making these polyamides include, among others, 1,10-decanedioic acid, 1,12-dodecanedienedioic acid, 1,20-eicosadienedioic acid, 1,14-tetradecanedioic acid, 1,18-octadecanedioic acid and dimerized and trimerized fatty acids as described above. Amines used in making the polyamides include preferably the aliphatic and cycloaliphatic polyamines as ethylene diamine, diethylene triamine, triethylene tetramine, tetraethylene pentamine, 1,4-diamino-butane, 1,3-diaminobutane, hexamethylene diamine, 3-(N-isopropylamino)propylamine and the like. Especially preferred polyamides are those derived from the aliphatic polyamides containing no more than 12 carbon atoms and polymeric fatty acids obtained by dimerizing and/or trimerizing ethylenically unsaturated fatty acids containing up to 25 carbon atoms. These preferred polyamides have a viscosity between 10 and 750 poises at 40° C., and preferably 20 to 250 poises at 40° C. Preferred polyamides also have amine values of 50 to 450.

Still another group of curing agents are those based on melamine reaction products containing methylol substituents.

Preferred are the polyamines and amides. Preferred curing agents include aliphatic polyamines, polyglycoldiamines, polyoxypropylene diamines, polyoxypropylenetriamines, amidoamines, imidazolines, reactive polyamides, ketimines, araliphatic polyamines (i.e. xylylenediamine), cycloaliphatic amines (i.e. isphoronediamine or diaminocyclohexane) menthane diamine, 3,3-dimethyl-4,4-diamino-dicyclohexylmethane, heterocyclic amines (aminoethyl piperazine), aromatic polyamines, (methylene dianiline), diamino diphenyl sulfone, mannich base, phenalkamine, N,N'N''-tris(6-aminohexyl) melamine, and the like. Most preferred are cyanamide, dicyandiamide, and its derivatives, diaminodiphenyl sulphone and methylene dianiline.

Catalysts useful in this invention are those catalysts which catalyze the reaction of a polyepoxide with a curing agent, and which remains latent in the presence of the inhibitor at lower temperatures. Latent means herein that the catalyst does not catalyze the reaction at the lower temperatures. Preferably the catalyst is latent at temperatures of 150° C. or below, and more preferably at 160° C. or below. Latency is demonstrated by significantly higher stroke cure times when the inhibitor is present as compared to compositions not containing the inhibitor. Examples of preferred catalyst are compounds containing amine, phosphine, heterocyclic nitrogen, ammonium, phosphonium or sulfonium moieties. More preferred catalyst are the heterocyclic nitrogen and amine containing compounds and even more preferred compounds are heterocyclic nitrogen containing compounds.

Examples of such heterocyclic nitrogen compounds include those described in Copending, allowed patent application titled "Latent, Curable, Catalyzed Mixtures of Epoxy Containing and Phenolic Hydroxyl Containing Compounds" U.S. Pat. No. 4,525,901 filed Nov. 18, 1988, relevant parts incorporated herein by reference. Among referred heterocyclic nitrogen containing compounds useful as catalysts are those possessing in the heterocylic ring (1) a substituted C=N—C group and (2) a secondary amino group, including the imidazoles, such as the substituted imidazoles and benzimidazoles having the structural formula:

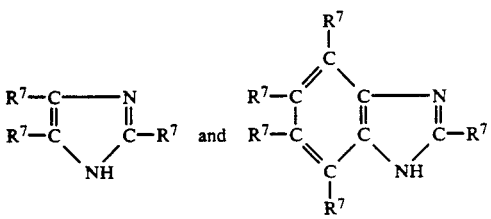

respectively, wherein $R^7$ is independently in each occurrence selected from hydrogen atoms, halogen atoms, or an organic radical, such as a hydrocarbon radical or a substituted hydrocarbon radical, for example, the ester, ether, amide, imide, amino, halogen, or mercapto substituted hydrocarbon radicals. Especially preferred imidazoles are those wherein $R^7$ is hydrogen or hydrocarbon radical and preferably an alkyl, alkenyl, cycloalkyl, cycloalkenyl, aryl, alkaryl or arylalkyl radicals, and particularly those containing no more than 15 carbon atoms.

A more detailed description of the chemistry of the imidazoles and benzimidazoles including their properties and structural formulas is found in the book by Klaus Hofmann entitled "Imidazole and Its Derivates" published by Interscience Publishers, Inc., New York (1953). Examples of imidazoles include, among others, imidazole, benzimidazole and substituted examples of suitable substituted imidazoles include: 2-methyl imidazole; 2-ethyl, 4-methyl imidazole; 2-cyclohexyl, 4-methyl imidazoles; 4-butyl, 5-ethyl imidazole; 2-butoxy, 4-allyl imidazole; 2-carboethyoxybutyl, 4-methyl imidazole; 2-octyl 4-hexyl imidazole; 2-methyl, 5-ethyl imidazole; 2-ethyl, 4-(2-ethylamino) imidazole; 2-methyl, 4-mercaptoethyl imidazole; 2,5-chloro-4-ethyl imidazole; and mixtures thereof. Especially preferred are the alkyl-substituted imidazoles; 2,5-chloro-4-ethyl imidazole; and mixtures thereof. Even more preferred are 2-methyl imidazole; 2-ethyl, 4-methyl imidazole; and 2-phenyl imidazole. Especially preferred is 2-methyl imidazole.

Among preferred tertiary amines that may be used as catalysts are those mono- or polyamines having an open chain or cyclic structure which have all of the amine hydrogen replaced by suitable substituents, such as hydrocarbon radicals, and preferably aliphatic, cycloaliphatic or aromatic radicals. Examples of these amines include, among others, methyl diethanol amine, triethylamine, tributylamine, dimethyl benzylamine, triphenylamine, tricyclohexyl amine, pyridine, quinoline, and the like. Preferred amines are the trialkyl, tricycloalkyl and triaryl amines, such as triethylamine, triphenylamine, tri(2,3-dimethylcyclohexyl)amine, and the alkyl dialkanol amines, such as methyl diethanol amines and the trialkanolamines such as triethanolamine. Weak tertiary amines, e.g., amines that in aqueous solutions give a pH less than 10, are particularly preferred.

Especially preferred tertiary amine accelerators are benzyldimethylamine and trisdimethylaminomethyl phenol.

The inhibitor is boric acid or maleic acid. Boric acid as used herein refers to boric acid or derivatives thereof, including metaboric acid and boric anhydride. It is believed that boric acid and its derivatives are all capable of functioning as an inhibitor when added to the compositions of the invention either in the form added or in a converted form. Boric acid is preferred over maleic acid. Inhibitor as used herein shall mean a compound which functions to retard the curing reaction at lower temperatures, preferably, 140° C. or lower, more preferably 150° C. or lower. Inhibition is demonstrated by a longer stroke cure time (gel time) for compositions containing the inhibitor as compared to like compositions not containing the inhibitor.

The inhibitor and catalysts may be separately added to the compositions of this invention, or may be added as a complex. The complex is formed by contacting and intimately mixing a solution of the inhibitor with a solution of the catalyst. Such contacting generally is performed at ambient temperature, although other temperatures may be used for example temperatures of about 0° C. to about 100° C., more preferably about 20° C. to about 60° C. The time of contacting is that sufficient to complete formation of the complex, and depends on the temperature used, with from about 5 to about 120 minutes preferred, and about 10 to about 60 minutes more preferred. The solvents used for each component are preferably miscible. Most preferably the same solvent is used. Preferred solvents for the catalyst and the inhibitor are polar solvents, with alcohols being preferred. Lower alcohols are even more preferred, with methanol most preferred. Alternatively, the components of the complex may be contacted neat, in the absence of solvent and reacted as described.

The reinforcing material which may be coated with the compositions of this invention include any material which would be used by the skilled artisan in formation of composites, prepregs, laminates and the like. Examples of the forms of such materials are cloth, mesh, web, fibers, or the like. Preferably, such materials are made from glass, fiberglass, paper, plastics such as aromatic polyamides, graphite and the like. Preferred materials include glass or fiberglass, in cloth or web form. Other additives may also be present including fillers, dyes, pigments, surfactants, flow control agents and the like.

In one embodiment the epoxy resin composition comprises a diepoxide, a dihydroxyhydrocarbon or halogenated dihydroxyhydrocarbon, an epoxy curing agent which does not contain phenolic hydroxyl moieties, a catalyst for the epoxy curing reaction, and an inhibitor. In this embodiment the diepoxide undergoes reaction with both the dihydroxyhydrocarbon or halogenated dihydroxy hydrocarbon and the curing agent. Thus the diepoxide is advanced in situ during the reaction. In one embodiment, the diepoxide, dihydroxy hydrocarbon or halogenated dihydroxy hydrocarbon and inhibitor can be contacted prior to the addition of the curing agent and catalyst. Those polyfunctional dihydroxyhydrocarbon or halogenated dihydroxy hydrocarbon useful are well-known in the art see for example Lee and Neville, supra; and Bertram U.S. Pat. No. 4,594,291 col 8 lines 24 to 36, relevant parts incorporated herein by reference.

All concentrations of components used in this invention are quoted in parts of components per hundred parts of resin (phr). Such hundred parts of resin refers specifically to the polyepoxide included in the composition. The amount of curing agent which may be present may vary depending upon the particular curing agent used. Generally preferred amounts of curing agent are from about 0.5 to 30 parts of curing agent per hundred parts of resin. More preferably from 1.0 to 10.0, and most preferably from 2 to 4 parts. The catalysts are employed in a sufficient amount to result in a substantially complete cure of the epoxy resin, with some crosslinking. Preferably the catalyst is used in an amount of from about 0.01 to 10 parts per hundred parts of resin, with from 0.05 to 5.0 parts per hundred parts of resin being more preferred and from 0.1 to 2.0 catalyst per hundred parts of resin being most preferred. The amount of inhibitor used is that amount which significantly increases the stroke cure time (gel time) of a composition when compared to a similar composition not containing the inhibitor. In one embodiment, the inhibitor is present in amounts up to about 2.0 phr, more preferably up to about 1.5 phr. Preferably about 0.05 phr or more of inhibitor is used, more preferably about 0.1 phr or more is used. In those embodiments where an equivalent amount of catalyst is used, or where a complex of inhibitor and catalyst is prepared prior to contacting with the polyepoxide, up to about 5.0 phr inhibitor may be used, provided the stroke cure rate is significantly increased. The Molar ratio of inhibitor to catalyst is that ratio which is sufficient to inhibit the reaction of the polyepoxide or advanced epoxy resin as exhibited by an increase in gel time as compared to a like composition free of inhibitor. Simple experimentation can determine the particular levels of inhibitor which will cause the aforementioned increase in gel time but still allow a complete cure at elevated temperatures. A preferable Molar ratio range of inhibitor to catalyst where up to 2.0 phr of boric acid is used, is from about 0.1:1.0 to about 4.0:1.0, with a more preferred range being from 0.4:1.0 to about 3.0:1.0, with an even more preferred range of 0.7:1.0 to about 2.0:1.0 with the most preferred range being 0.9:1.0 to 1.5:1.0.

Compositions containing polyepoxide, curing agent, catalyst and inhibitor may be contacted with a reinforcing material in any method known to those skilled in the art. Examples of such contacting methods include powder coating, spray coating, and contacting the reinforcing material with a bath containing the composition. In a preferred embodiment the reinforcing material is contacted with the composition in a bath. Preferably the bath contains a solids levels of between about 50 and 75% solids. In such a bath the various components of the epoxy resin compositions are dissolved or suspended in the bath. A single solvent may be used for the bath, but in many applications a separate solvent is used for each component added to the mixture. It is preferable that the various solvents used be miscible with one another. Such solvents or diluents, include those which are volatile and escape from the composition prior to cure. Preferred solvents for the epoxy resins are ketones, including acetone, methylethylketone and the like. Preferred solvents for the curing agents are slightly polar solvents, amides, e.g. DMF, ether alcohols, e.g., methyl, ethyl, propyl or butyl ethers of ethylene glycol, diethylene glycol, propylene glycol or dipropylene glycol for example, ethylene glycol monomethyl ether, 1 methoxy, 2-propanol. The catalysts and inhibitors are preferably dissolved in polar solvents, in particular alcohols, preferably lower alkanols and most preferably methanol.

In one embodiment, the invention is a process for preparing prepregs from the resin composition and the reinforcing material. Such process comprises contacting the reinforcing material with an intimately mixed bath comprising: a polyepoxide in a solvent; a curing agent for the polyepoxide or advanced epoxy resin in a solvent; an inhibitor comprising boric acid or maleic acid in a polar solvent; and a compound which catalyzes the curing of the polyepoxide with the curing agent in a polar solvent. The coating occurs under condition such that the reinforcing material is coated with epoxy resin, curing agent, inhibitor, and catalyst. Thereafter the coated reinforcing materials are passed through a heated zone at a temperature sufficient to cause the solvents to evaporate, but below the temperature which the polyepoxide undergoes significant cure during the residence time in the heated zone. The reinforcing material preferably has a residence time in the bath of between about 0.1 min and about 10 min, more preferably between about 0.3 min and about 8 min, and most preferably between about 0.5 min and about 3 min. The temperature of such bath is preferably between about 0° and about 100° C., more preferably between about 10° and about 40° C. and most preferably between about 15° and 30° C. The residence time of the coated reinforcing material in the heated zone is between about 0.5 and about 15 min, more preferably between about 1 and about 10 min, and most preferably between about 1.5 and about 5 min. The temperature of such zone is sufficient to cause any solvents remaining to volatilize away yet not so high as to result in a complete curing of the components. Preferable temperatures of such zone are between about 80° and about 230° C., more preferably between about 100° and about 200° C., and most preferably between about 140° and about 190° C. Preferably there is some means in the heated zone to remove the solvent, either by passing an inert gas through the oven, or drawing a slight vacuum on the oven. In many embodiments the coated materials are exposed to zones of increasing temperature. The first zones are designed to cause the solvent to volatilize so it can be removed. The later zones are designed to result in partial cure of the polyepoxide, i.e. so called B-staging.

In some embodiments the coated reinforcing material may be then transported to another location for further processing, or alternatively the material may be further processed immediately after solvent removal. In such further processing, several segments or parts of the coated reinforcing material are brought in contact with one another. Thereafter, the contacted parts are exposed to elevated pressures and temperatures sufficient to cause the epoxy resin to cure wherein the resin on adjacent parts react to form a continuous epoxy resin matrix between and about the reinforcing material. Before being cured the parts may be cut and stacked or folded and stacked into a part of desired shape and thickness. The pressures use can be anywhere from about 1 to about 200 kg/cm$^2$, with from about 10 to about 100 kg/cm$^2$ being preferred. The temperature used to cure the resin in the parts or laminates, depends upon the particular residence time, pressure used, and resin used. Preferred temperature which may be used are between about 100° and about 190° C., more preferably between about 120° and about 180° C., and most preferably between about 140° and about 175° C. The residence times may be anywhere from about 30 min to about 300 min, more preferably from about 45 to about 200 min, and most preferably from about 60 to about 180 min. One embodiment of such a process is known as a continuous process. In such process, the reinforcing material is taken from the oven and appropriately arranged into the desired shape and thickness and pressed at very high temperatures for short times, in particular such high temperatures are from about 180° to about 250° C., more preferably about 190° to about 210° C., at times of about 1 to about 10 min and from about 2 to about 5 min. Such high speed pressing allows for the more efficient utilization of processing equipment. In such embodiments the preferred reinforcing material is a glass, web or woven cloth.

In some embodiments it is desirable to subject the laminate or final product to a post cure outside of the press. This step is designed to complete the curing reaction. The post cure is usually performed at from about 130° to about 200° C. for between about 20 and about 200 minutes. This post cure step may be performed in a vacuum to remove any components which may volatilize.

The ultimate coated reinforced parts prepared from the composition of this invention often demonstrate a higher Tg than where the compositions not within the scope of this invention are used. In some embodiments the Tg is at least 5° C. higher than parts prepared similarly using conventional resins. More preferably the Tg is increased by at least 10° C. The parts prepared using the composition of this invention, demonstrate a higher solvent resistance, e.g., demonstrate a pick-up of less than 1.0% N-methyl pyrrolidone in test methods conditions.

Furthermore such parts exhibit a higher thermal performance as there is little or no solvent entrapped. The formulations of this invention preferably exhibit longer gel times at certain temperatures as compared to prior art formulations.

SPECIFIC EMBODIMENTS

The following examples are presented to illustrate the invention and are not intended to limit the scope of the claims. Unless otherwise stated all parts and percentages are by weight.

EXAMPLES

EXAMPLE 1

Preparation of Varnish

A varnish is prepared by mixing and blending four solutions with agitation in a container for approximately 30 minutes. The four solutions comprise 125 parts of a brominated epoxy resin having a bromine content of 20% and an epoxy equivalent weight of 430, prepared from the diglycidyl ether of bisphenol A and tetrabromobisphenol A which is dissolved in methylethylketone (MEK) with on 80% solids (non-volatiles) content; 2.19 parts of boric acid solution (20% in methanol); 36 parts of a solution of dicyandiamide (7.5%) dissolved in monomethylether of propylene glycol (69.9%) and dimethylformamide (22.6%); 4 parts of 2-methyl imidazole (2-MI) solution (10% in methanol).

EXAMPLE 2

Preparation of Varnsih

A second varnish is prepared by mixing and blending the following four solutions with simple agitation in a container for approximately 30 minutes: 125 parts of a brominated epoxy resin having a bromine content of 20% and an epoxy equivalent weight of 430, prepared from the diglycidyl ether of bisphenol A and tetrabromobisphenol A dissolved in methylethylketone (MEK) to have 80% solids content; 1.65 parts of boric acid solution (20% in methanol); 40 parts of dicyandiamide (7.5%) dissolved in monomethyl ether of propylene glycol (69.9%) and dimethylformamide (22.6%); and 3.5 parts of 2-methyl imidazole (2-MI) solution (10% in methanol).

EXAMPLE 3

Preparation of Varnish

A solution containing 62.2 parts of a polyglycidylether of 2,2-bis(4-hydroxy-phenyl) propane having an epoxide equivalent weight of about 180, 32.8 parts of tetrabromobisphenol A, and 5.0 parts of monomethyl ether of propylene glycol is prepared by blending and mixing the polyglycidyl ether and tetrabromobisphenol A (TBBA) at room temperature and heating to 130° C. Approximately 30 min is required to obtain a homogenous mixture. The mixture is cooled to 70° C. and the monomethyl ether of propylene glycol is added. Another 30 minutes is required to obtain a homogenous solution.

A third varnish is prepared by mixing and blending the above described solution with the following three solutions with simple agitation in a container for approximately 30 minutes: 1.57 parts of boric acid solution (20% in methanol); 34.2 parts of dicyandiamide (7.5%) dissolved in monomethyl ether of propylene glycol (69.9%) and dimethylformamide (22.6%); and 3.8 parts of 2-methyl imidazole solution (10% in methanol)

EXAMPLE 4

Preparation of Varnish

A fourth varnish is prepared by blending and mixing the following four solutions by simple agitation in a container for approximately 30 minutes: 125 parts of a brominated epoxy resin having a bromine content of 20% and an epoxy equivalent weight of 418, prepared from the diglycidyl ether of bisphenol A and tetrabromobisphenol A dissolved in methylethylketone to have 80% solids content; 4.5 parts of a boric acid solution (20% in methanol); 40 parts of dicyandiamide (7.5%) dissolved in monomethyl ether of propylene glycol (69.9%) and dimethylformamide (22.6%); and 1.6 parts of a 2-methyl imidazole solution (50% in methanol).

EXAMPLE 5

Preparation of Varnish—Not an Example of the Invention

A varnish is prepared by mixing and blending the following three solutions by simple agitation in a container for approximately 30 minutes: 125 parts of a brominated epoxy resin having a bromine content of 20% and an epoxy equivalent weight of 430, prepared from the diglycidyl ether of bisphenol A and tetrabromobisphenol A which is dissolved in methylethylketone (MEK) with on 80% solids (non-volatiles) content; 40 parts of dicyandiamide (7.5%) dissolved in monomethyl ether of polypropylene glycol (69.9%) and dimethylformamide (22.6%); and 1 part of 2-methyl imidazole in methanol (10% solution).

EXAMPLE 6

Preparation of Varnish—Not an Example of the Invention

A varnish is prepared by mixing and blending the following three solutions by simple agitation in a container for approximately 30 minutes: 125 parts of a brominated epoxy resin having a bromine content of 20% and an epoxy equivalent weight of 430, prepared from the diglycidyl ether of bisphenol A and tetrabromobisphenol A which is dissolved in methylethylketone (MEK) with on 80% solids (non-volatiles) content; 40 parts of dicyandiamide (7.5%) dissolved in monomethyl ether of polypropylene glycol (69.9%) and dimethylformamide (22.6%); and 2.5 parts of 2-methyl imidazole in methanol (10% solution).

EXAMPLE 7

Preparation of Varnish

A varnish is prepared by mixing and blending the following four solutions by simple agitation in a container for approximately 30 minutes: 125 parts of a brominated epoxy resin having a bromine content of 20% and an epoxy equivalent weight of 430, prepared from the diglycidyl ether of bisphenol A and tetrabromobisphenol A dissolved in methylethylketone (MEK), and having an 80% solids content; 40 parts of dicyandiamide (7.5%) dissolved in monomethyl ether of propylene glycol (69.9%) and dimethylformamide (22.6%); and 1.67 parts of a solution resulting from mixing 82.1 parts of 2-methyl imidazole and 63.65 parts of boric acid dissolved in 97.1 parts of methanol to give a 60% solids solution.

EXAMPLE 8

Preparation of Varnish

A solution containing 62.2 parts of a polyglycidylether of 2,2-bis(4-hydroxy-phenyl) propane having 32.8 parts of tetrabromobisphenol A, and 5.0 parts of acetone is prepared by blending and mixing the polyglycidyl ether and tetrabromobisphenol A (TBBA) at room temperature and heating to 130° C. Approximately 30 min is required to obtain a homogenous mixture. The mixture is cooled to 70° C. and the acetone is added. Another 30 minutes is required to obtain a homogenous solution.

A varnish is prepared by mixing and blending the above described solution with the following three solutions with simple agitation in a container for approximately 30 minutes: 38 parts of dicyandiamide (7.5%) dissolved in monomethyl ether of propylene glycol (69.9%) and dimethylformamide (22.6%); and 1.425 parts of the product resulting from mixing 82.1 parts of 2-methyl imidazole and 63.65 parts of boric acid dissolved in 97.1 parts of methanol resulting in a solution having 60% solids.

EXAMPLE 9

Preparation of Varnish

A varnish is prepared by blending and mixing the following three solutions by simple agitation in a container for approximately 30 minutes; 125 parts of brominated epoxy resin having a bromine content of 20% and an epoxy equivalent weight of 430, prepared from the diglycidyl ether of bisphenol A and a tetrabromobisphenol A dissolved in methylethylketone (MEK) to have 80% solids content; 40 parts of dicyandiamide (7.5%) dissolved in monomethyl ether of propylene glycol (69.9%) and dimethylformamide (22.6%); and 3.17 parts of the product resulting from mixing 82.1 parts of 2-methyl imidazole and 63.65 parts of boric acid dissolved in 97.1 parts of methanol to give 60% solids.

EXAMPLE 10

Preparation of Varnish—Not an Example of the Invention

A varnish is prepared by blending and mixing the following solutions by simple agitation in a container for approximately 30 minutes; 58.95 parts of the glycidyl polyether of 2,2-bis (4-hydroxy-phenyl) propane having an epoxide equivalent weight of about 180; 31.05 parts of tetrabromobisphenol A and 10 parts of methylethylketone; 40.8 parts of dicyandiamide (7.5%) dissolved in monomethyl ether of propylene glycol (69.9%) and dimethylformamide (22.6%); and 5.4 parts of 2-ethyl, 4-methyl imidazole dissolved in methanol (10% solution).

EXAMPLE 11

Preparation of Varnish—not an Example of the Invention

A laminating varnish is prepared by mixing and blending the following solutions by simple agitation in a container for approximately 30 minutes at room temperature. 125 parts of brominated epoxy resin having a bromine content of 21.5% and an epoxy equivalent weight of 520, prepared from the diglycidyl ether of bisphenol-A and a tetrabromobisphenol A dissolved in methylethylketone (MEK) to have 80% solids content; 40 parts of dicyandiamide (7.5%) dissolved in monomethyl ether of polypropylene glycol (69.9%) and dimethylformamide (22.6%); and 1 part of 2-methyl imidazole in methanol (10% solution).

Prepregs and Electrical Laminates Preparation Procedures

A Prepregs Preparation

The varnishes of Examples 2 to 5 and 7 to 13 are applied to woven E glass type 7628 available from INTER GLASS by pulling the cloth through a resin bath containing the laminating varnish and then up through a doctor bar set at 0.5 mm to 1.5 mm and then through staged heating zones of an oven with temperatures varying from 140° C. to 190° C. for examples 2 to 5 and from 150° C. to 170° C. for examples 7 to 13. The total length of heating zone is 3 m. The glass cloth is passed through the resin bath and the heating zones at a rate of 0.8 to 3.2 m/min. The parameters of the horizontal treater used are adjusted to produce prepregs with the following characteristics:

|  | | Test Method |
|---|---|---|
| Rest gel time at 170° C. | 60–120 sec | NEMA LI 1-12.19 |
| Flow at 170° C. | 2–25% | NEMA LI 1-14.32 |
| Volatiles | <1% | |
| Resin content | 37–44% | NEMA LI 1-12.16 |

NEMA refers herein to the National Electrical Manufacturers Association. The above described tests are performed according to the test procedures corresponding to the numbers provided. Such test procedures are incorporated herein by reference. NEMA is located 2101 L. Street N.W., Suite 300, Washington D.C. 20037.

Laminate Preparation

The laminates are obtained from 8 plies of prepreg (15 cm × 15 cm) laid up between two sheets of copper foil and pressed in a laboratory press.

The prepregs obtained from varnishes examples 7 and 11 are pressed for 15, 30, 60 and 90 min in the press at 165° C. The prepregs obtained from examples 9 and 10 are pressed at 210° C. for 2 and 3 mins. The pressure of the press is set at 40 kg/cm$^2$.

The prepregs obtained from varnishes from examples 2 to 4 are pressed for 40 min in the press at 165° C. (10 min heating from room temperature to 165° C. and 30 minutes at 165° C.) with controlled pressures to obtain laminate thickness of 1.3 to 1.6 mm. A prepreg prepared using a varnish from example 4 is pressed at 200° C. for 5 minutes at 30 kg/cm$^2$.

Test Methods

Varnish Properties Measurements

Gel Time Measurement

The gel time of different varnishes is measured by reacting the mixture on the surface of a hot plate at 150° C., 160° C. and 170° C. The temperature is calibrated by Signotherm temperature indicators.

Glass Transition Temperature Measurements

The glass transition temperature is measured on film prepared from the varnish formulation used for gel time measurement. The films are cured on a hot plate 170° C. for 30 min. Samples are run at 10° C./min. The glass transition temperature is measured by a Mettler TA 2000 DTA at a heating rate of 10° C./min. The inflection point minus 5° C. of the endothermic response was taken as the glass transition temperature.

Prepreg Properties Measurements

Gel Time Measurements—Stroke Cure

The partially cured resin is removed from the glass, and put on accurately regulated hot plate at 170° C. It is then stroked with a metal wire until gelation occurs. The time from the first contact of the resin dust with hot plate to gelation is recorded as the gel time or rest reactivity of the prepreg.

Volatile Determination

A sample of prepreg approximately 10 cm × 10 cm is weighed to the nearest 0.001 gram ($W_1$).

The sample is placed in a circulating air oven at 163° C. for 15 minutes and on removal it is placed immediately in a desicator to cool. When cool, the sample is reweighed and the weight recorded as $W_2$. The volatile content is calculated from:

$$\% \text{ volatiles} = \frac{(W_1 - W_2) \times 100}{W_1}$$

Resin Content

The resin content is measured by simply weighing an exactly determined surface of prepreg, and comparing with the weight of the same area of glass cloth. The resin content is given by the:

$$\text{Resin content } (\%) = \frac{\text{Weight of the square of prepreg} - \text{Weight of the square of glass}}{\text{(Weight of the square of prepreg)}} \times 100$$

Flow Measurement

The flow test indicates the extent of the B-staging and it simulates the behaviour of the resin system within the pressing operation. According to NEMA LI 1-14.32 procedure six plies of prepreg of determined size are weighed to the nearest 0.01 gram, stacked together with their edges in careful alignment, fastened together and loaded into the preheated press. The temperature of the press plates is 170° C. and pressure is 14 kg/cm$^2$. After 10 minutes the specimen is removed and allowed to cool. Then the flowed resin is removed by cutting and weighing to the nearest 0.01 gram. The resin flow is calculated from the equation:

$$\% \text{ flow} = \frac{\text{(Initial weight} - \text{weight without flowed resin)}}{\text{Initial weight}} \times 100$$

Flow Measurement

Prepregs obtained from continous pressing formulation

Six samples, 10 cm × 10 cm are cut in a prepreg sheet and stuck between two copper foils, the shiny copper side facing the prepreg and acting as release sheets. The lab press is heated between 210° C., with a pressure of 30 bars. Pressing time of 1 minute obtains a flow sample. The sample is weighed and a 50 cm$^2$ disk is punched out of the 100 cm$^2$ sample. Flow is given as:

$$\% \text{ flow} = \frac{\text{Sample weight} - 2 \times \text{(disk weight)}}{\text{Initial weight}} \times 100$$

Laminate Testing

Chemical Resistance

To measure the chemical resistance, pieces of etched laminates 5 cm × 5 cm are cut, weighed and dipped for 30 minutes in N-methylpyrrolidone solvent at 23° C. The pieces are dried and then weighed; the pick-up is taken as the gain in weight.

Glass Transition Temperature Measurements

The glass transition temperature of laminates is measured by a Mettler TA 2000 DTA at a heating rate of 10° C./min. The inflection point minus 5° C. of the endothermic response was taken as the glass transition temperature.

Moisture Resistance

Twelve pieces of etched laminates 6 cm × 1.5 cm are placed in a pressure cooker during 30, 60, or 90 minutes at 120° C. under 1.2 atm. steam. Then, after being dried are dipped (20 seconds) in a tin solder bath (260° C.). The moisture absorption is determined by observation from the formation of blisters.

Copper Peel Strength

The binding strength between the copper and the epoxy resin is determined through the strength needed to peel the copper off a laminate. The copper peel strength test is performed according to IPC test Method 2.4.8 Peel Strength, Metal Fort. A 10 cm × 10 cm square of copper foil is laminated to a laminate of the invention. The specimens are tested for peel strength at room temperature. The copper foil is peeled back approximately one inch, so the line of peel is perpendicular to the edge of the specimen. The specimen is clamped on a horizontal surface with the peeled metal strip projecting upward for 1 inch. The end of the foil is gripped between the jaws of the clamp such that the jaws cover the full width of the metal strip and are parallel to the line of peel. Force is exerted in the vertical plane, and the metal foil is pulled at 2 inches per minute. The load is observed and converted to pounds per inch of width. The final peel strength is the average of three tests.

The gel times of varnishes from Examples 1 to 6 are measured. The results are compiled in Table I.

TABLE I
GEL TIMES OF DIFFERENT VARNISHES AT DIFFERENT TEMPERATURES

| Examples | Gel Time at 150° C. (sec) | Gel time at 160° C. (sec) | Gel time at 170° C. (sec) | Tg* |
|---|---|---|---|---|
| 1 | 445 | 319 | 203 | 150 |
| 2 | 390 | 271 | 172 | 148 |
| 3 | 310 | 220 | 140 | 148 |
| 4 | 353 | 240 | 161 | 152 |
| 5** | 362 | 245 | 171 | 125 |
| 6** | 194 | 133 | 88 | 134 |

*The glass transitions are measured on films obtained by curing the different varnishes at 170° C. for 30 min.
**Not an example of the invention.

TABLE II
FR-4 RESIN FORMULATIONS, VARNISHES, PREPREG AND LAMINATES PROPERTIES

| Example | 2 | 3 | 4** I | 4** II | 5 |
|---|---|---|---|---|---|
| TREATER SETTING | | | | | |
| Oven temp. zones 1/2 (°C.) | 148/183 | 150/190 | 150/171 | 154/182 | 150/170 |
| Winding speed (m/min) | 1.5 | 3 | 0.85 | 2 | 2.6 |
| VARNISH PROPERTIES | | | | | |
| Gel time 170° C. (sec) | 172 | 140 | 161 | 161 | 171 |
| Viscosity (Ford Cup No. 4, sec) | 28 | 27 | 40 | 40 | 44 |
| PREPREG PROPERTIES | | | | | |
| % Resin content | 40.7 | 39 | 46.5 | 44 | 37.5 |
| % Volatiles | 0.2 | 0.2 | 0.2 | 0.2 | 0.2 |
| Rest gel time, 170° C. (sec) | 66 | 54 | — | 65 | 140 |
| % Flow | 11.2 | 13.8 | 6.6 | 18 | 25.7 |
| Appearance | good | excell. | good | good | good |
| LAMINATE PROPERTIES | | | | | |
| Tg (°C.) | 143 | 142 | 148 | 152 | 127* |
| Chemical Resistance (% NMP pick-up) | 0.6 | 0.2 | 0.4 | 0.3 | 0.5* |
| Blister Resistance (PCT MIN) | 60 | 60 | — | — | 60* |
| Copper Peel Strength (N/cm) | 18 | 18 | 17 | 18 | 21* |

*Laminates properties from the following press cycle

| | Pressure (kg/cm²) | Time (min) |
|---|---|---|
| 1. Room temperature to 170° C. | 14 | 30 |
| 2. Keep at 170° C. | 40 | 90 |
| 3. Cool to room temperature | 40 | 15 |

**The same varnish 4 is used to prepare continuous press prepregs (I) and standard FR-4 prepregs (II) at different treating speeds. Prepregs (I) are pressed at 200° C. for 5 minutes to obtain laminates for testing.

| Example | 7 | 8 | 11* |
|---|---|---|---|
| VARNISH PROPERTIES | | | |
| Gel time 170° C. (sec) | 147 | 119 | 300 |
| Viscosity (Ford Cup No 4, sec) | 29 | 20 | 21 |
| PREPREG PROPERTIES | | | |

TABLE II-continued
FR-4 RESIN FORMULATIONS, VARNISHES, PREPREG AND LAMINATES PROPERTIES

| % Resin content | 43 | 41 | 40 |
|---|---|---|---|
| % Volatiles | 0.17 | 0.26 | — |
| Rest gel time, 170° C. (sec) | 60 | 104 | 139 |
| % Flow | 14.3 | 21.6 | 11.8 |
| Appearance | good | good | good |
| LAMINATE PROPERTIES (obtained from 30 min at 165° C.) | | | |
| Tg (deg C.) | 142 | 142 | 122 |
| Chemical resistance (% NMP pick-up) | 0.2 | 0.2 | 3.3 |
| Blister resistance (PCT MIN) | 30 | 30 | 30 |
| Copper peel strength (N/cm) | 17.2 | 17 | 20 |

*Not an example of the invention

Laminates are prepared from Examples 9, 10. The properties of the varnishes, prepreg and laminates are compiled in Table III.

TABLE III
FR-4 RESIN FORMULATIONS FOR CONTINUOUS PRESSING TECHNOLOGY-CURED RESINS, PREPREGS AND LAMINATES PROPERTIES

| Example | 9 | 10 |
|---|---|---|
| VARNISH PROPERTIES | | |
| Gel time 170° C. (sec) | 91 | 106 |
| Viscosity (Ford Cup No 4, sec) | 28 | 19 |
| PREPREG PROPERTIES | | |
| % Resin content | 40.7 | 42 |
| % Volatiles | 0.1 | 0.1 |
| % Flow | 4.5 | 3.5 |
| Appearance | good | good |
| LAMINATE PROPERTIES (obtained from 2 and 3 min at 210° C.) | | |
| Tg (deg C. I/II)* | | |
| 2 min | 145/145 | 136/136 |
| 3 min | 146/147 | 136/135 |
| Chemical resistance (% NMP pick-up) | | |
| 2 min | 0.1 | 0.5 |
| 3 min | 0.05 | 0.5 |
| Copper peel strength (N/cm) | 17 | 18 |

*The Tg is determined twice for the same sample and both values are reported. The second determination is made after the sample is cooled from the previous test.

The glass transition and solvent resistance of laminates from varnishes of Example 7 and 11 are measured. Results compiled in Table IV.

TABLE IV
GLASS TRANSITION TEMPERATURE AND SOLVENT RESISTANCE MEASURED FROM LAMINATES OF EXAMPLES 7 AND 11.

| Press Time (min | 15 | 30 | 60 | 90 |
|---|---|---|---|---|
| 7 Tg (°C.) | 125 | 142 | 145 | 146 |
| % NMP pick-up | 0.3 | 0.16 | 0.16 | 0.15 |
| 11* Tg (°C.) | 107 | 122 | 123 | 124 |
| % NMP pick-up | 4.4 | 3.3 | 2.5 | 2.4 |

*Not an example of the invention.

The top number is the glass transition temperature. The bottom number is the percent weight gain when exposed to N-methyl pyrolidone (NMP).

TABLE V

COMPARISON OF TREATER PARAMETERS AND
PREPREG PROPERTIES FOR EXAMPLES 7, 8 AND 5

| Examples | 7 | | 8 | | 5* | |
|---|---|---|---|---|---|---|
| VARNISH GEL TIME (170° C., sec) | 147 | | 119 | | 171 | |
| OVEN TEMP. (recorded) | | | | | | |
| Zone 1 (deg C.) | 150 | | 145 | | 150 | |
| Zone 2 (deg C.) | 170 | | 165 | | 170 | |
| GAP (mm) | 0.6 | 0.6 | 1 | 1 | 0.75 | 0.65 |
| WINDING SPEED (m/min) | 2.5 | 2.8 | 2.6 | 3 | 2.3 | 2.6 |
| PREPREG PROP. Resin content (%) | 39.8 | 42.1 | 41.2 | 43.0 | 39.5 | 37.5 |
| Rest gel time at 170° C. (sec) | 102 | 126 | 104 | 108 | 116 | 140 |
| Flow (%) | 16.7 | 18.3 | 21.6 | 23 | 17.6 | 25.7 |
| Appearance | good | good | good | good | good | good |

*Not an Example of the Invention.

EXAMPLE 12

An isocyanate modified epoxy resin is prepared by the process described below from the following components; 400 parts of a polyglycidyl ether of 2,2-bis(4-hydroxy-phenyl) propane (bisphenol A) having an epoxide equivalent weight of about 180; 260 parts of brominated epoxy resin with bromine content of 49% prepared from the diglycidyl ether of 2,2-bis(4-hydroxy-3,5 dibromo-phenyl) propane (tetrabromobisphenol A) and 2.2-bis(4-hydroxy-3,5-dibromo pheynl) propane (tetrabromobisphenol A); 0.6 parts 2-phenyl imidazole dissolved in an equal amount of methanol; 90 parts methylene diphenyl diisocyanate (available from The Dow Chemical Company under the trademark Voranate* M 220) and 250 parts of methylethylketone. The resin is prepared by the following procedure.

The liquid epoxy resin and brominated epoxy resin are charged to a reactor. The mixture is stirred and heated under a nitrogen atmosphere to about 90° C. The catalyst of 2-phenyl imidazole is added to the mixture once it reaches 90° C. The mixture is heated to 150° C. Methylenediphenyl diisocyanate is added over a period of 30 to 45 minutes. The reaction temperature is maintained between 155° and 175° C. during the addition. The mixture is heated on addition 30 minutes. A portion is removed and titrated to determine the epoxy content. It is determined to be 12%. The mixture is cooled to 130° C. and methylethylketone is added.

133.33 parts of the isocyanate modified epoxy resin solution is blended with 2.5 parts of a boric acid in methanol solution (20%) (0.5 phr boric acid); 42.66 parts of dicyandiamide (7.5%) in monomethyl ether of propylene glycol (69.9%) and dimethylformamide (22.6%) solution, (3.2 phr); and a 1.1 parts of 50 percent 2-methyl imidazole in methanol (0.55 phr), at room temperature for 30 minutes.

EXAMPLE 13

Not an Example of the invention 133.33 parts of the isocyanate modified epoxy resin prepared as in Example 12 are blended with, 42.66 parts of a dicyandiamide (7.5%) in monethylether of propylene glycol (69.9%) and dimethylformamide (22.6%) solution and 0.18 parts of 50% 2-methyl imidazole in methanol (0.09 phr) at room temperature for 30 minutes.

Prepregs and laminates are prepared using the varnishes of Examples 12 and 13. The properties of the varnishes, prepregs, and laminates are determined by the processes described above. The results are compiled in Table VI.

TABLE VI

| | Example 12 | Example 13* |
|---|---|---|
| VARNISH PROPERTIES | | |
| Gel time (170° C.) sec | 191 | 253 |
| Viscosity (Ford cup No. 4, sec) | 28 | 30 |
| Treating parameter | 154/174 | 150/178 |
| Oven temp. (Zone 1/2 , °C.) | | |
| Winding speed (m/min) | 2.1 | 1.8 |
| PREPREG PROPERTIES | | |
| Resin Content (%) | 44 | 43 |
| Gel Time (170° C., sec) | 70 | 115 |
| Flow (%) | 16.5 | — |
| LAMINATE PROPERTIES (45 min at 175° C.) | | |
| Tg (°C. I/II)** | 179/182 | 155/165 |
| NMP pick-up (%) | 0.11 | 0.18 |

*Not an example of the invention
**The Tg is determined twice for the same sample and both values are reported. The second determination is made after the sample is cooled from the previous test.

EXAMPLE 14 to 19

Varnishes are prepared by blending an 125 parts of a brominated epoxy resin having a bromine content of 20% and an epoxy equivalent weight of 418, prepared from the diglycidyl ether of bisphenol A and tetrabromobisphenol A dissolved in methylethylketone (80% solids); 40 parts of a solution of dicyandiamide (7.5%) in monomethyl ether of propylene glycol (69.9%) and dimethylformamide (22.6%), (3 phr); a catalyst and in examples 15, 17 and 19 boric acid. The relative amounts of catalyst and boric acid are compiled in Table VIII. The gel time and glass transition temperature are measured of films cured at 170° C. for 30, and 60 minutes prepared from the varnishes. The results are compiled in Table VII.

TABLE VII

| Example | Catalyst | phr | Boric-acid phr | Varnish 150° C. | Varnish 160° C. | Varnish 170° C. | Glass Transition °C. 30 min | Glass Transition °C. 60 min |
| --- | --- | --- | --- | --- | --- | --- | --- | --- |
| 14* | Ethyltriphenyl phosphonium acetate.Acetic acid complex | 0.2 | 0 | — | — | 307 | — | 131 |
| 15 | Ethyltriphenyl phosphonium acetate.Acetic acid complex | 1.0 | 0.524 | — | — | 391 | — | 140 |
| 16* | butyl dimethyl amine | 0.2 | 0 | 366 | 299 | 240 | 130 | 138 |
| 17 | butyl dimethyl amine | 1.0 | 0.524 | — | 347 | 245 | 136 | 143 |
| 18* | Diisobutyl amine | 0.2 | — | — | — | 510 | — | — |
| 19 | Diisobutyl amine | 1.0 | 0.524 | — | — | >780 | — | — |

*Not an example of the invention

EXAMPLES 20–40

Varnishes are prepared from three different resins using varying amounts of curing agent, dicyandiamide; inhibitor, boric acid; and catalyst, 2-methyl imidazole. Resin A is brominated epoxy resin having a bromine content of 20% and an epoxy equivalent weight of 418, prepared from the diglycidyl ether of bisphenol A and tetrabromobisphenol A dissolved in methylethylketone (80% solids).

Resin B is brominated epoxy resin with a bromine content of 19 percent and an epoxy equivalent weight of 395 prepared from the diglycidyl ether of bisphenol A and tetrabromobisphenol A in methylethylketone 80% solids.

Resin C is a brominated epoxy resin having a bromine content of 20% and an epoxy equivalent weight of 430, prepared from the diglycidyl ether of bisphenol A and tetrabromobisphenol A dissolved in methylethylketone (80% solids content).

The resin solutions are blended with dicyandiamide (7.5%) in monomethyl ether of propylene glycol (69.9%) and dimethylformamide (22.6%); boric acid in methanol (20% boric acid); and 2-methyl imidazole in methanol (10% 2-methyl imidazole); at ambient temperature with agitation for about 30 minutes. The gel time of each varnish is determined at 150°, 160° and 170° C. A film is prepared from each resin, which is cured for 30 minutes at 170° C., the films from examples 33 to 38 are cured for 60 minutes. The glass transition temperature of the films are determined. The results are compiled in Table VIII.

TABLE VIII

| Example | Resin | Curing Agent phr | Boric Acid phr | Catalyst phr | Gel Time (sec) 150° C. | Gel Time (sec) 160° C. | Gel Time (sec) 170° C. | Tg °C. |
| --- | --- | --- | --- | --- | --- | --- | --- | --- |
| 20 | A | 3 | 0.33 | 0.2 | 1086 | 484 | 303 | 134 |
| 21 | A | 3 | 0.33 | 0.3 | 532 | 340 | 212 | 148 |
| 22 | A | 3 | 0.33 | 0.4 | 353 | 232 | 152 | 148 |
| 23 | A | 3 | 0.33 | 0.5 | 250 | 163 | 100 | 153 |
| 24 | A | 2.7 | 0.437 | 0.3 | 662 | 454 | 278 | 137 |
| 25 | A | 2.7 | 0.437 | 0.4 | 445 | 319 | 203 | 149 |
| 26 | A | 2.7 | 0.437 | 0.5 | 288 | 230 | 141 | 146 |
| 27 | A | 2.7 | 0.437 | 0.6 | 221 | 170 | 91 | 153 |
| 28 | A | 2.7 | 0.524 | 0.3 | 751 | 508 | 339 | 147 |
| 29 | A | 2.7 | 0.524 | 0.4 | 528 | 390 | 256 | 147 |
| 30 | A | 2.7 | 0.524 | 0.5 | 386 | 274 | 164 | 148 |
| 31 | A | 2.7 | 0.524 | 0.6 | 283 | 200 | 132 | 158 |
| 32 | B | 2.7 | 0.65 | 0.6 | 319 | — | 158 | 153** |
| 33 | B | 2.7 | 0.75 | 0.65 | 292 | — | 156 | 157** |
| 34 | B | 2.7 | 0.7 | 0.65 | 286 | — | 142 | 149** |
| 35 | C | 2.7 | 0.65 | 0.6 | 347 | — | 165 | 156** |
| 36 | C | 2.7 | 0.75 | 0.65 | 313 | — | 155 | 157** |
| 37 | C | 2.7 | 0.7 | 0.65 | 293 | — | 148 | 152** |
| 38 | C | 2.7 | 0.8 | 0.8 | 205 | 162 | 100 | 154 |
| 39 | C | 3 | 0.25 | 0.3 | 342 | 234 | 165 | 147 |
| 40 | C | 3 | 0.25 | 0.4 | 233 | 163 | 98 | 144 |

**60 min resident time at 170° C.

EXAMPLE 41

A varnish comprising 125 parts of resin B, 37.33 parts of a dicyandiamide (7.5%) in monomethyl ether of propylene glycol (69.9%) and dimethylformamide (22.6%); 2.5 parts of boric acid (20%) in methanol; and 1.1 parts of 2 methyl imidazole (50%) in methanol is prepared, as described in Example 1. The Gel time of the varnish is measured at 150° and 170° C. periodically over a eleven day period. The results are compiled in Table IX.

TABLE IX

| Varnish Storage Stability at Room Temperature | | | | | |
|---|---|---|---|---|---|
| No. of Days | 0 | 3 | 4 | 5 | 11 |
| Gel Time at 150° C. (sec) | 386 | 381 | — | 387 | 386 |
| Gel Time at 170° C. (sec) | 164 | 173 | 171 | 173 | 172 |

EXAMPLES 41 to 47

Varnishes are prepared by blending a 125 parts of a brominated epoxy resin having a bromine content of 20% and an epoxy equivalent weight of 418, prepared from the diglycidyl ether of bisphenol A and tetrabromobisphenol A, dissolved in methylethylketone (80% solids); 40 parts of a solution of dicyandiamide (7.5%) in monomethyl ether of propylene glycol (69.9%) and dimethylformamide (22.6%), (3 phr); a catalyst (pyridine or triphenyl phosphine) and in examples 43 and 46 boric acid. The relative amounts of catalyst and boric acid are compiled in Table VIII. The gel time is measured. The results are compiled in Table X.

TABLE X

| Example | Catalyst | phr | Boric Acid phr | Gel Time at 170° C. (sec) |
|---|---|---|---|---|
| 41* | Pyridine | 0.2 | — | 361 |
| 42* | Pyridine | 0.4 | — | 308 |
| 43 | Pyridine | 1.1 | 1 | 319 |
| 44* | Pyridine | 1.5 | — | 223 |
| 45* | Triphenyl phosphine | 0.2 | — | 395 |
| 46 | Triphenyl phosphine | 1.5 | 1 | 354 |
| 47* | Triphenyl phosphine | 1.5 | — | 202 |

*Not an example of the invention

EXAMPLES 48 TO 89

Varnishes with different levels of catalyst, curing agent, and inhibitor are prepared by the following procedure. The stroke cure rate, gel time, and the glass transition temperature are determined. The amounts of components, gel times and glass transition temperatures are compiled in Table XI.

A 20% solution of boric acid in methanol is added to brominated epoxy resin prepared by advancing the diglycidyl ether of bisphenol A with tetrabromobisphenol A to 4.7 to 5.0% epoxide, then back blending with diglycidyl ether of bisphenol A to a 9.8 to 10.1% epoxide, the final product is diluted to 80% solids in acetone. The mixture is stirred till homogeneous, then allowed to stand for different time intervals at ambient temperature. To this solution is added a 10% solution of dicyandiamide (10% by weight dicyandiamide in a 50/50 mixture of dimethyl formamide and monomethyl ether of propylene glycol stirred till homogeneous), then a 40% solution of 2-methyl imidazole in methanol is added and stirred till homogeneous. This solution is then allowed to stand at ambient temperature 2 hours before gel times or cured products are made.

Gel time is determined via a stroke-cure procedure at 175° C. Glass transition temperatures were determined via differential scanning calorimetry (DSC) at a heating rate of 10° C. per minute, using the midpoint of the transition.

TABLE XI

| Example | Boric acid (phr) | 2-methyl imidazole (phr) | Dicyandi amide (phr) | Gel Time (sec) | Tg (°C.) | Stand time (hrs) |
|---|---|---|---|---|---|---|
| 48 | 0.4 | 0.35 | 2.5 | 246* | 146 | 24 |
| 49 | 0.4 | 0.35 | 3 | 246* | 145 | 24 |
| 50 | 0.4 | 0.75 | 3 | 87.5* | 135 | 24 |
| 51 | 0.4 | 0.75 | 2.5 | 86.5* | 140 | 24 |
| 52 | 0.8 | 0.75 | 2.5 | 186* | 143 | 24 |
| 53 | 0.8 | 0.75 | 3 | 181.5 | 142 | 24 |
| 54 | 0.8 | 0.35 | 3 | 288 | 148 | 24 |
| 55 | 0.8 | 0.35 | 2.5 | 349.5 | 154 | 24 |
| 56 | 0.6 | 0.55 | 2.75 | 189.5 | 149 | 24 |
| 57 | 0.6 | 0.55 | 2.75 | 197 | 148 | 24 |
| 58 | 0.6 | 0.55 | 2.75 | 190 | 140 | 0 |
| 59 | 0.6 | 0.55 | 2.75 | 214 | 144 | 1.5 |
| 60 | 0.6 | 0.55 | 2.75 | 232 | 149 | 24 |
| 61 | 0.6 | 0.55 | 2.75 | 232 | 150 | 12 |
| 62 | 1.01 | 0.55 | 2.75 | 278 | 156 | 1.5 |
| 63 | 1.51 | 0.55 | 2.75 | 270 | 158 | 1.5 |
| 64 | 1.01 | 0.55 | 2.75 | 270 | 157 | 24 |
| 65 | 1.51 | 0.55 | 2.75 | 268 | 161 | 24 |
| 66 | 1.01 | 0.55 | 2.75 | 273 | 154 | 12 |
| 67 | 1.51 | 0.55 | 2.75 | 270 | — | 12 |
| 68 | 1.01 | 0.35 | 2.5 | — | 157 | 15 |
| 69 | 1.51 | 0.35 | 2.5 | — | 162 | 15 |
| 70 | 0.6 | 0.55 | 2.75 | 230 | 153 | 0 |
| 71 | 0.6 | 0.55 | 2.75 | 205 | 153 | 1 |
| 72 | 0.6 | 0.55 | 2.75 | 199 | 146 | 2 |
| 73 | 0.6 | 0.55 | 2.75 | 201 | 149 | 3 |
| 74 | 0.6 | 0.55 | 2.75 | 202 | — | 6 |
| 75 | 0.2 | 0.175 | 2 | 353 | 140 | 2 |
| 76 | 0.2 | 0.175 | 2.5 | 349 | 147 | 12-16 |
| 77 | 0.2 | 0.35 | 2.5 | 140 | 138 | 12-16 |
| 78 | 0.2 | 0.35 | 2 | 162 | 142 | 12-16 |
| 79 | 0.4 | 0.35 | 2 | 298 | 151 | 12-16 |
| 80 | 0.4 | 0.35 | 2.5 | 260 | 149 | 12-16 |
| 81 | 0.4 | 0.175 | 2.5 | 451 | 150 | 12-16 |
| 82 | 0.4 | 0.175 | 2 | 571 | 140 | 12-16 |
| 83 | 0.3 | 0.2625 | 2.25 | 290 | — | 12-16 |
| 84 | 0.3 | 0.2625 | 2.25 | 284 | 149 | 12-16 |
| 85 | 0.8 | 0.175 | 2 | 583 | 148 | 12-16 |
| 86 | 0.8 | 0.175 | 2.5 | 485 | 149 | 12-16 |
| 87 | 0.8 | 0.35 | 2.5 | 360 | 153 | 12-16 |
| 88 | 0.8 | 0.35 | 2 | 433 | 153 | 12-16 |
| 89 | 1.4 | 0.263 | 2.25 | 232 | 154 | 12-16 |
| 90 | 1.4 | 0.263 | 2.25 | 230 | 155 | 12-16 |

*Stroke times for Examples 48–58 are the average of two samples.

We claim:
1. An epoxy resin composition comprising
   (A) a polyepoxide;
   (B) a cure inhibitor consisting essentially of boric acid in an amount from about 0.01 to about 2.0 parts per 100 parts of polyepoxide;
   (C) optionally an epoxy resin catalyst; and
   (D) optionally an epoxy resin curing agent which does not contain phenolic hydroxyl moieties.
2. An epoxy resin composition of claim 1 which further comprises a curing agent which does not contain phenolic hydroxyl moieties.
3. The epoxy resin composition of claim 2 which further comprises an epoxy resin catalyst comprising an amine, heterocyclic nitrogen containing phosphine, sulfide, ammonium, phosphonium or sulfonium containing compound capable of accelerating the cure of the polyepoxide with a curing agent.
4. The epoxy resin composition of claim 3 wherein the catalyst is an amine or heterocyclic nitrogen containing compound.
5. The epoxy resin composition of claim 4 wherein the catalyst is a tertiary amine containing compound or a heterocyclic amine.
6. The epoxy resin composition of claim 5 wherein the catalyst is 2-methyl imidazole; 2-ethyl, 4-methyl imidazole or 2-phenyl imidazole.
7. An epoxy resin composition of claim 5 wherein between about 0.01 to 2.0 parts of tertiary amine or heterocyclic amine containing compound per hundred parts of resin are present.

* * * * *